United States Patent [19]

Mirkowicz

[11] Patent Number: 5,684,927
[45] Date of Patent: Nov. 4, 1997

[54] AUTOMATICALLY UPDATING AN EDITED SECTION OF A VOICE STRING

[75] Inventor: Waldemar J. Mirkowicz, Plano, Tex.

[73] Assignee: InterVoice Limited Partnership, Reno, Nev.

[21] Appl. No.: 602,682

[22] Filed: Feb. 16, 1996

Related U.S. Application Data

[63] Continuation of Ser. No. 924,186, Aug. 3, 1992, which is a continuation-in-part of Ser. No. 905,622, Jun. 29, 1992, which is a continuation of Ser. No. 537,033, Jun. 11, 1990, abandoned.

[51] Int. Cl.[6] .................................................. G10L 3/02
[52] U.S. Cl. ................................................... 395/2.87
[58] Field of Search .......................... 395/2, 2.44, 2.57, 395/2.62, 2.69, 2.79, 2.87, 326–335

[56] References Cited

U.S. PATENT DOCUMENTS

| | | | |
|---|---|---|---|
| 3,641,496 | 2/1972 | Slavin | 395/2.83 |
| 4,375,083 | 2/1983 | Maxemchuk | 395/2.87 |
| 4,458,110 | 7/1984 | Mozer | 395/2.2 |
| 4,622,879 | 11/1986 | Matsubara | 84/609 |
| 4,627,001 | 12/1986 | Stapleford et al. | 395/2.87 |
| 4,653,100 | 3/1987 | Barnett et al. | 395/2.77 |
| 4,712,180 | 12/1987 | Fujiyama et al. | 434/323 |
| 4,764,965 | 8/1988 | Yoshimura et al. | 395/2.87 |
| 4,779,209 | 10/1988 | Stapleford et al. | 395/2.87 |
| 4,852,168 | 7/1989 | Sprague | 395/2.2 |
| 4,956,806 | 9/1990 | Crowe et al. | 395/792 |
| 5,151,998 | 9/1992 | Capps | 395/12.87 |
| 5,220,611 | 6/1993 | Nakamura et al. | 395/2.87 |

OTHER PUBLICATIONS

Visual Voice Editor (V Edit), Software Product Description, Rhetorex Corp., 1996, 4 pages (Internet Address=www, rhetorex, com).

VFEDIT ®, The Professional Prompt Editor, Software Product Description, Voice INformation Systems, Inc. (VISI), 1996, 5 pages (Internet=vinfo.com/vfedit. htm).

Audio Toolbox™ Processor & Converter, Software Product Description, VISI, 1997, 3 pages, (Internet=vinto. com/ Toolbox.htm).

*Primary Examiner*—David D. Knepper
*Attorney, Agent, or Firm*—Fulbright & Jaworski L.L.P.

[57] ABSTRACT

First and second voice signals are labelled with unique corresponding first and second names. The first and second names are concatenated symbolically creating the voice signal string. Editing of the voice signal string is accomplished by modifying an attribute of the first voice signal where the first name continues to label the first voice signal, thereby removing a need to reconcatenate the first and second names subsequent to the editing step. As such the previously concatenated voice signal string remains unchanged apart from modification of the first voice signal.

20 Claims, 6 Drawing Sheets

AUTOMATICALLY UPDATING AN EDITED SECTION OF A VOICE STRING

This application is a continuation of application Ser. No. 07/924,186, filed Aug. 3, 1992, which is a continuation-in-part of application Ser. No. 07/905,622 filed Jun. 29, 1992, entitled "Voice Editor" by Waldemar J. Mirkowicz which is a continuation of application Ser. No. 07/537,033, filed Jun. 11, 1990, now abandoned, entitled "Voice Editor" by Waldemar J. Mirkowicz.

TECHNICAL FIELD OF THE INVENTION

This invention relates in general to a system for editing a signal representing a voice and, more specifically, to such a system which allows the user to label, manipulate and redefine subsegments of voice.

BACKGROUND OF THE INVENTION

Voice editors, in general, are not new. For years, systems have existed which allow a user to record, either in analog or digital form, a human voice. These systems allow the user to display the voice on an output device of a general purpose computer and allow the user to manipulate, typically by deleting, reordering or copying, the voice to produce a desired voice signal string.

In some ways, voice editors can be analogized to text editors or word processors. It is commonplace to encounter functions such as "cut," "copy" and "paste" in both word processors and voice editors. These commands allow a user to manipulate text or voice and, in the prior art, have been roughly analogous in operation.

However, there is a major difference which arises in connection with editing voice versus editing text. The difference has to do with the nature of that which is being edited. Text occurs in discrete units, i.e., characters. Characters are strung together to form words. Words have spaces between them. Words are strung together to form sentences, etc. To edit text, word processors are well adapted to jump discretely from character to character or from word to word and, when it is desired to cut, copy or paste text, it is easy enough to do so by cutting between discrete characters. There is no such thing as manipulating part of a character. Either a whole character is manipulated or not at all.

Voice, however, is not nearly as simple to manipulate. For instance, a typical human voice signal may comprise a plurality of spoken words, each word having a space or pause between the words. However, the words are typically of different length, have pauses between the words of different length, and to further complicate the picture, it may or may not be clear when a particular word begins or ends, due to a finite attack and decay times in the human voice. Finally, even the spaces between the spoken words may not be quite so detectable. For instance, perhaps a background noise may exist which tends to further obfuscate the beginning or ending of the words.

Often, it is advantageous to record a string of words and to reorder those words to produce a multitude of sentences. For instance, in telecommunications, there exists a voice response unit ("VRU") which, under direction of a general purpose computer, accesses a library of individual words, concatenating or stringing those words together in real time to provide a multitude of sentences which, when interpreted into human voice by voice synthesizing circuitry, is spoken over a telephone line to a human listener, thereby allowing the listener to communicate with the VRU.

For example, let us assume that it is highly desirable to have a VRU which communicates telephone numbers in voice to a human being over the telephone. Perhaps the VRU must speak telephone numbers retrieved from a telephone directory, which may contain hundreds of thousands of telephone numbers. It is, therefore, highly impractical to have a person speak and record each of the hundreds of thousands of telephone numbers separately. Rather, recognizing the fact that a telephone number is simply a string of seven digits, each digit being from 0 to 9, it becomes, on its face, a simple matter to have a person record the speaking of those ten digits, and have the computer store each digit separately, recalling the digits in the order required to speak a particular telephone number.

However, at this point, another complication arises. In the early days of VRUs, it might have been acceptable to provide a highly mechanical, somewhat stilted speaking voice to a hapless listener. However, such is not now the case, and the voice spoken by a VRU is expected to be of high quality. The complication arises because the individually spoken digits must sound "natural" no matter in what order they are placed. This is particularly difficult because natural human speech has moments of both high and low pitch. For instance, a spoken question "sounds" different from a spoken statement. The difference lies in the inflection placed upon the sentence by the person speaking it.

In the past, voice editors, often working with digitized, sampled voice signals, required a user to examine a voice signal to guess as to what samples constitute individual words. The user would then concatenate the samples in a particular order to achieve a desired voice signal string. The user could then hear the string spoken but, if the string appeared to be unnatural in sound, the user would have to go back and add or remove samples as necessary. The user would have to then rebuild the entire string and play it again. This was extremely inefficient and tended to bog the user down in the task of building strings, rather than freeing the user to concentrate on the task of optimizing speech quality. For instance, let us assume that the user dealt with a string of spoken words "one two three." If the user wished to determine whether a "three two one" string, constructed with the words of the original "one two three" string sounded natural, the user would cut and paste the "three two one" string from the "one two three" string and play the "three two one" string. If the "three two one" string did not sound natural, the user had to "go back to the drawing board" and redefine his string from scratch.

Accordingly, the prior art utterly failed in its attempt to provide an efficient and effective means for editing voice signal strings which would allow a user to "microedit" particular words in a string without having to rebuild entire strings. Rather, the voice editors of the past merely treated voice signals in a manner analogous to the way text editors treated text, as discrete units each unit being an individual sample.

SUMMARY OF THE INVENTION

It is, accordingly, a primary object of the present invention to provide a method of editing a voice signal string, comprising the steps of labeling first and second voice signals with unique corresponding first and second names, concatenating the first and second names to thereby symbolically concatenate the first and second voice signals, the step of concatenating creating the voice signal string including the first and second voice signals and modifying an attribute of the first voice signal, the first name continuing to label the first voice signal following the step of modifying to thereby remove a need to reconcatenate the first and second names, the voice signal string remaining unchanged apart from modification of the first voice signal.

A further object of the present invention is to provide a method of editing a voice signal string wherein first and second names are single alphanumeric characters.

Another object of the present invention is to provide a method of editing a voice signal string wherein first and second voice signals represent individual spoken words.

Yet another object of the present invention is to provide a method of editing a voice signal string wherein spoken words have indefinite beginnings and endings.

Still a further object of the present invention is to provide a method of editing a voice signal string wherein a voice signal string can be played to a listener.

Yet another object of the present invention is to provide a method of editing a voice signal string wherein an attribute is a length of a first voice signal.

A further object of the present invention is to provide a method of editing a voice signal string wherein an attribute is a beginning time of a first voice signal.

And another object of the present invention is to provide a method of editing a voice signal string wherein an attribute is an ending time of a first voice signal.

In the attainment of the foregoing objects, the embodiment that encompasses the present invention is a system for editing a voice signal string, comprising circuitry and software for displaying first and second voice signals on a display device of a general purpose computer. Also included is circuitry and software for labeling the first and second voice signals with unique corresponding first and second names, as well as circuitry and software for concatenating the first and second names. Concatenation of the first and second names according to the present invention symbolically concatenates the first and second voice signals, thereby creating the voice signal string including the first and second voice signals. The concatenating circuitry and software of the present invention, includes a processing device in the general purpose computer, provides for modifying an attribute of the first voice signal, wherein the first name continues to label the first voice signal following the modifying to thereby remove a need to reconcatenate the first and second names, the voice signal string remains unchanged apart from modification of the first voice signal. Circuitry and software may play the voice signal string to a listener on an output device of the general purpose computer.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

Figure 1:
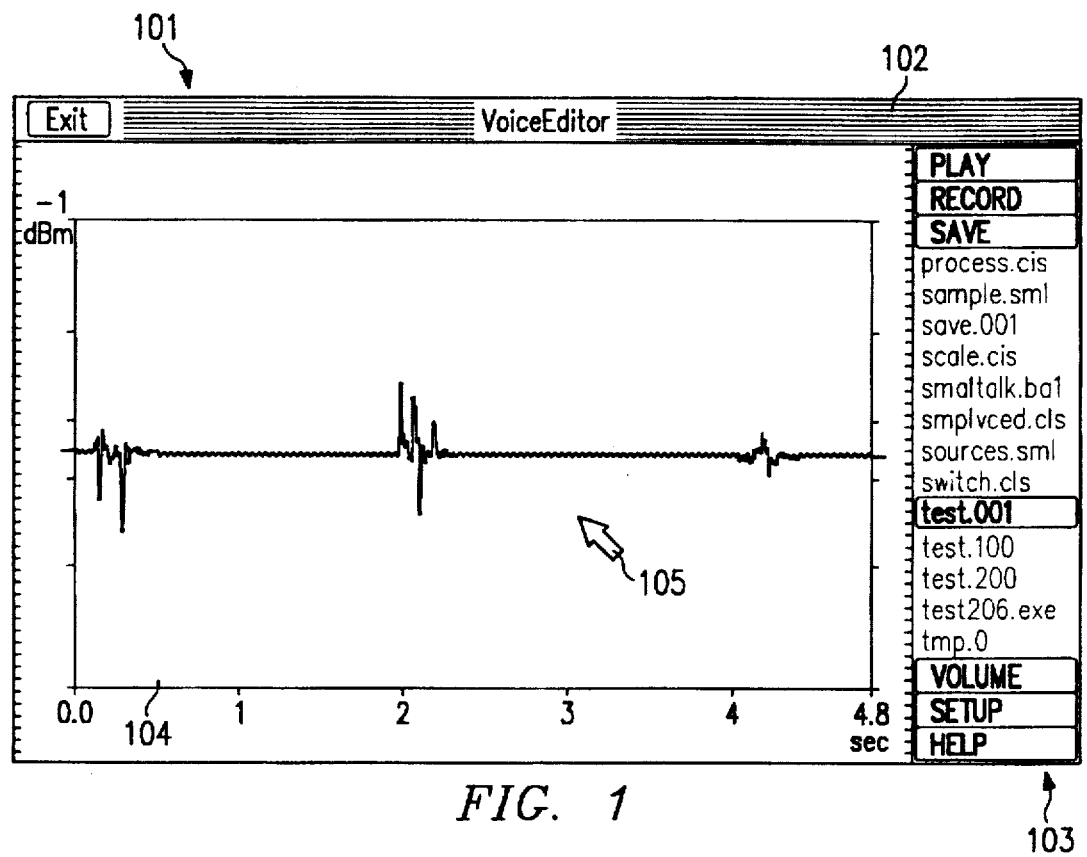
FIG. 1 shows a typical screen of a voice editor embodying the present invention.

Turning now to FIG. 1, shown is a voice editor screen embodying the present invention. The screen, generally designated 101, is graphical in nature and comprises a title bar 102, a command list 103 and a voice signal display area 104. Also included is a pointer 105 which allows the user to enable commands on the command list 103 or to point at a voice signal displayed in the voice signal display area 104.

Figure 2:
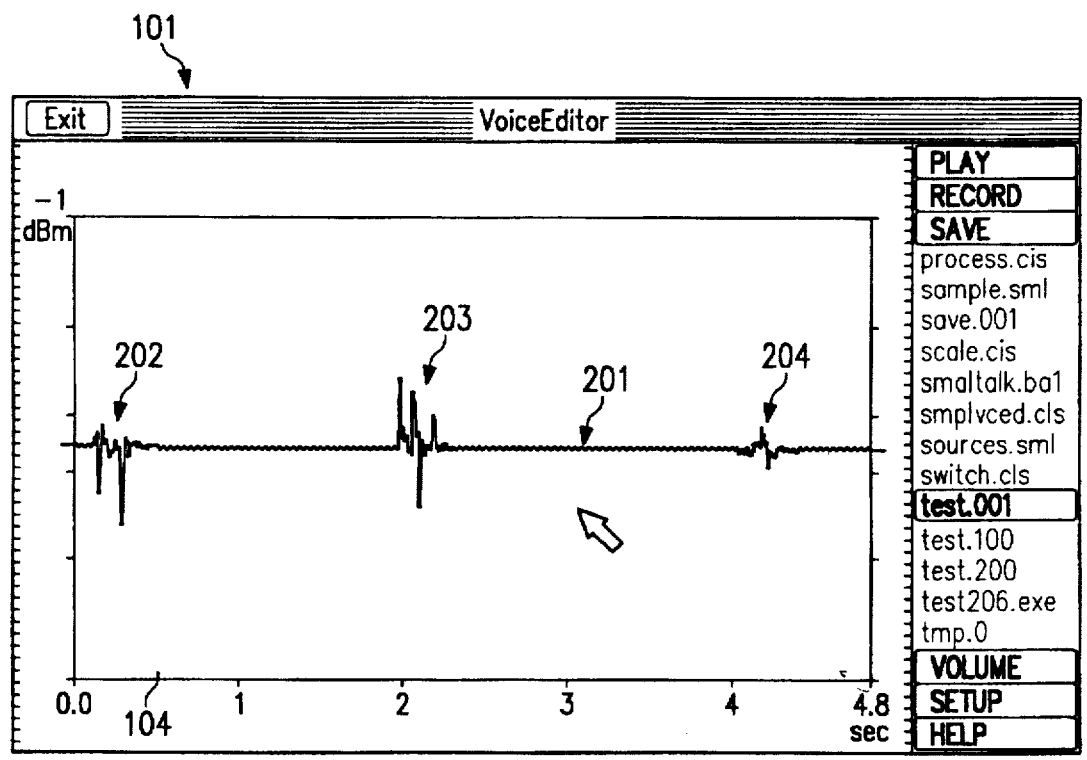
FIG. 2 shows a voice editor screen displaying voice signals.

Turning now to FIG. 2, shown is the voice editor screen 101 of FIG. 1. The screen 101 shows a voice signal, generally designated 201 in its voice signal display area 104. The voice signal 201 comprises periods of silence and periods of speech. However, as was explained in the preceding text, it is not always obvious where the silence ends and the speech begins. However, it does seem obvious from the signal illustrated in FIG. 2 that there are three spoken words: A first word 202, a second word 203 and a third word 204. The words 202, 203, 204 are separated by silence (not referenced). However, note that the silence itself is not devoid of sound. As shown, the "line" representing the silence has a finite, nonzero amplitude.

Figure 3:
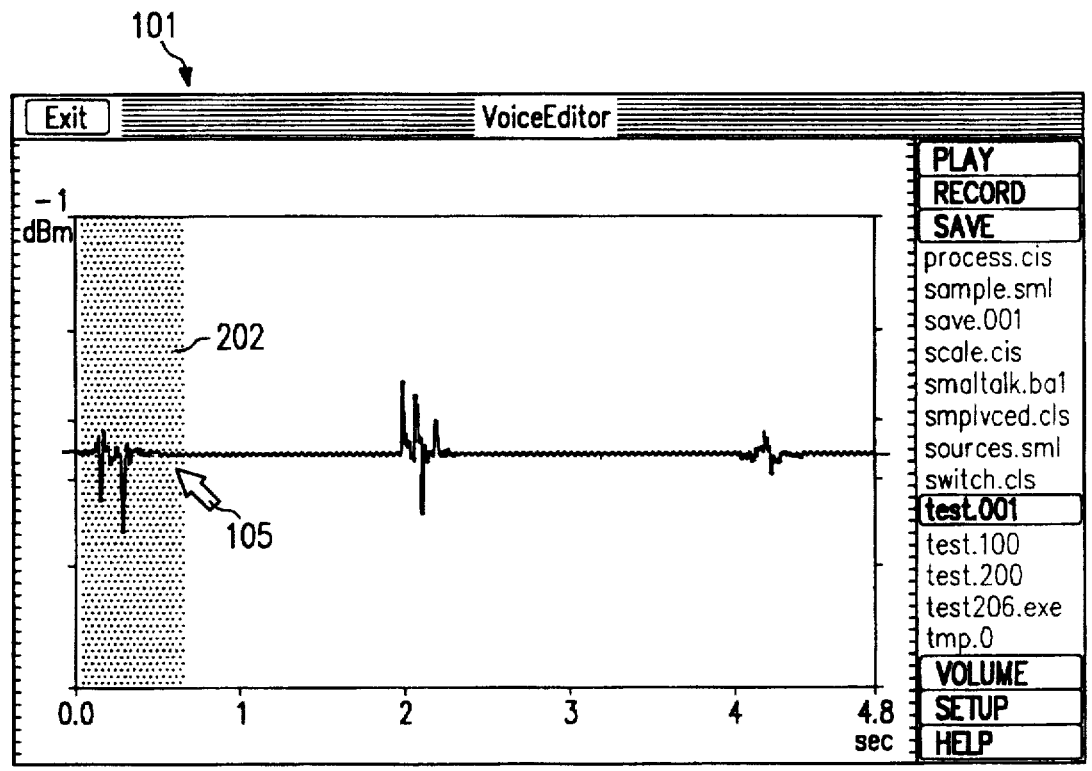
FIG. 3 shows a voice editor screen wherein a first voice signal is designated.

Turning now to FIG. 3, shown again is the voice editor screen 101 of FIG. 1. However, a user has begun to define a first voice signal. The first voice signal is meant to comprise the first word 202 of FIG. 2. The first voice signal is defined initially by placing the pointer 105 at a point along the signal 201 representing a certain time, and "dragging" that pointer 105 to a subsequent or previous point in time, thereby defining a period of time. The voice editor responds by "marking" that period of time with a darker color, as shown in FIG. 3.

Figure 4:
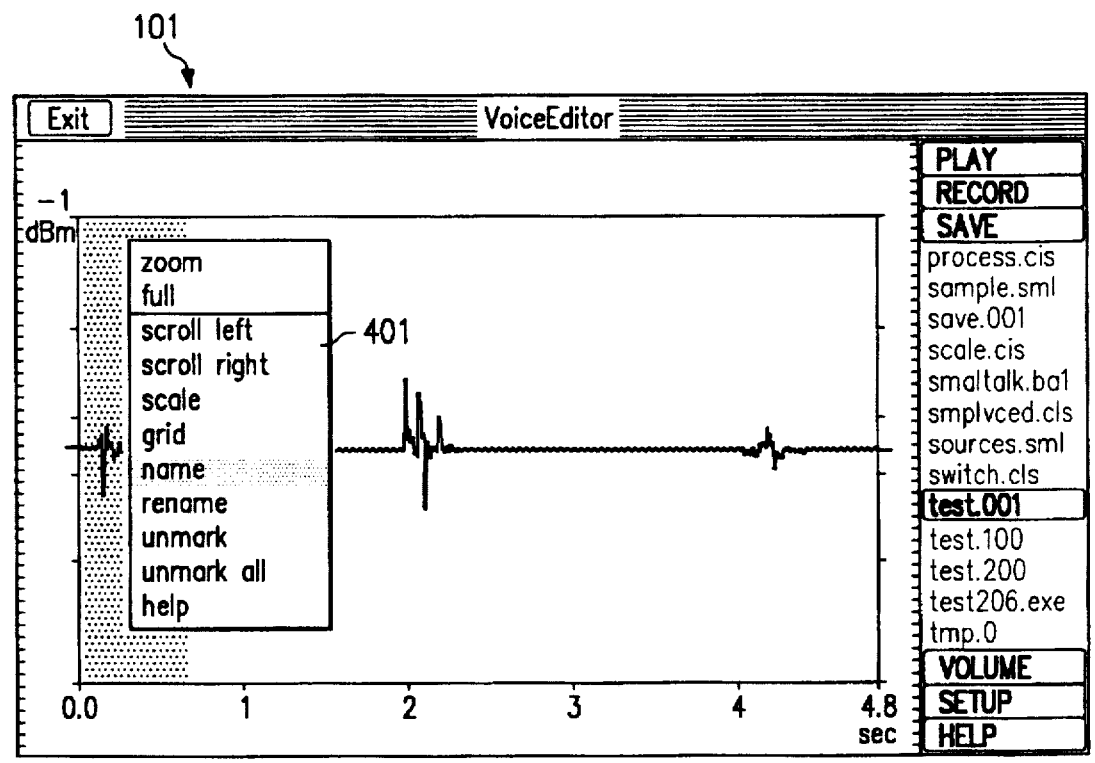
FIG. 4 shows a voice editor screen wherein the first voice signal of FIG. 3 is labeled.

Turning now to FIG. 4, shown is the voice editor screen 101 of FIG. 1. However, the user has invoked a pop-up menu 401, which will allow the user to provide a name to the first voice signal, as designated in FIG. 3. Accordingly, the user may assign a name to the first voice signal which, in the preferred embodiment of the invention, is a single alphanumeric character.

Figure 5:
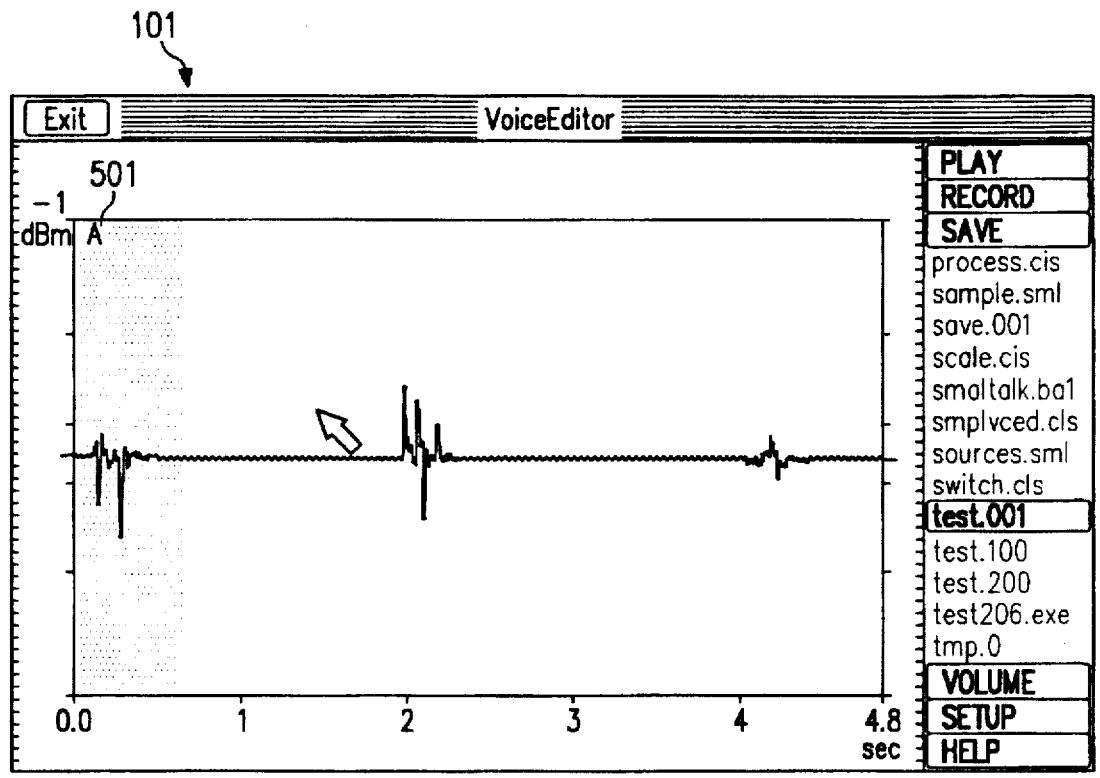
FIG. 5 shows a voice editor screen wherein the first voice signal is displayed with a first name.

Turning now to FIG. 5, shown again is the voice editor screen 101 of FIG. 1. However, the first voice signal has been provided with a name (viz. "A") 501. This name, henceforth termed a first name 501, designates that period of time encompassed within and defined to be the first voice signal. The user may, at this point, proceed to define and name subsequent voice signals.

Figure 6:
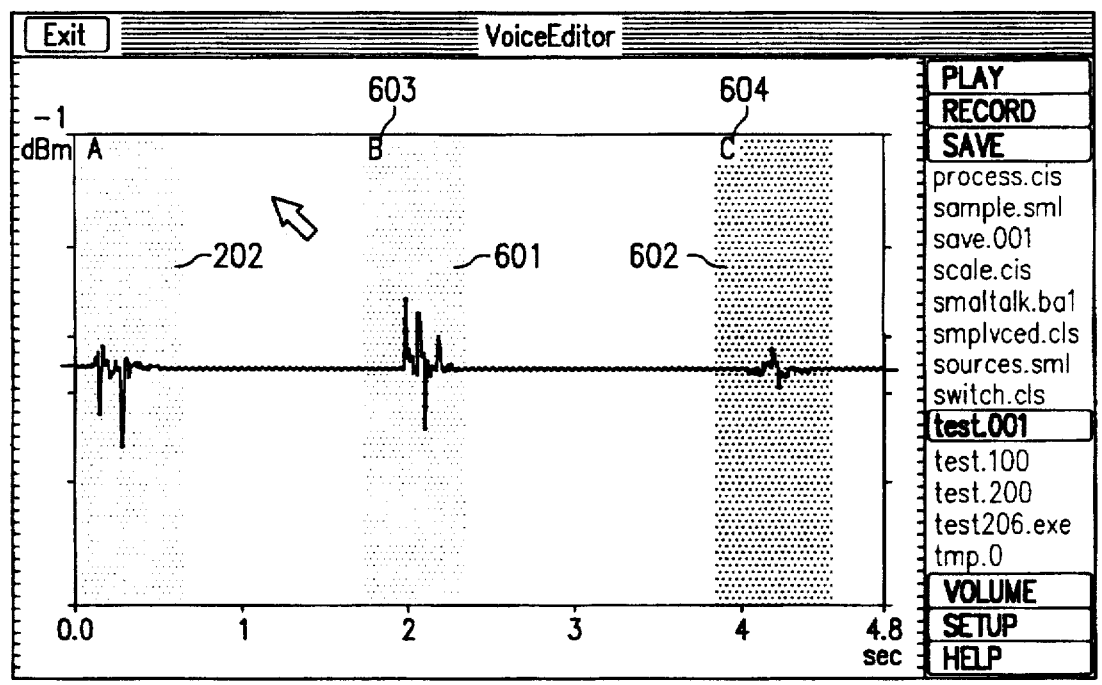
FIG. 6 shows a voice editor screen having first, second and third voice signals with corresponding first, second and third names.

Accordingly, turning now to FIG. 6, it is apparent that the user has defined other voice signals. In fact, the user has defined, in addition to the first voice signal 202, second and third voice signals 601, 602, respectively. The second and third voice signals 601, 602 have been labeled with single alphanumeric names, specifically "B" 603 (for second voice signal 601) and "C" 604 (for third voice signal 602). It is not particularly important at this time that the user properly designate when the first, second and third voice signals 202, 601, 602 begin and end. Rather, the purpose of the present invention embodied in the voice editor is to allow the user to take a "best first guess" as to where the voice signals begin and end, and to construct a string therefrom to test and refine his guesses empirically.

Figure 7:
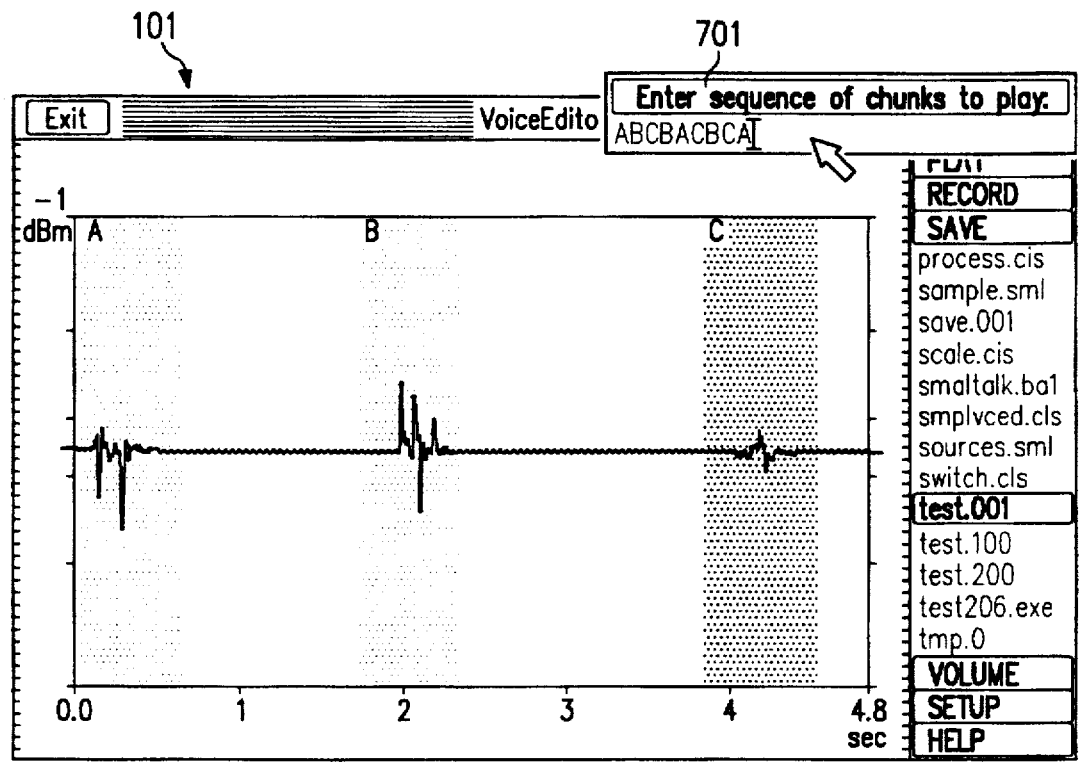
FIG. 7 shows a voice editor screen wherein a string is constructed and played using a combination of the first, second and third names.

Turning now to FIG. 7, shown is the voice editor screen 101 of FIG. 1. For purposes of FIG. 7, however, the user has opened a window by activating the "play" command found in the command list 103. The window, generally designated 701, allows the user to create and play, by simply stringing alphanumeric character names together, a string of voice. In the example shown in FIG. 7, the user wishes to play a string of words by playing the first, second and third voice signals in the order "ABCBACBCA."

Turning now to FIG. 8, shown again is the voice editor screen 101 of FIG. 1. For purposes of FIG. 8, it is assumed that the user has played the string designated in the window 701 of FIG. 7, but has not been happy with the outcome. In particular, the user is displeased with the way in which the second voice signal 601, designated "B," sounds. In fact, the user has determined that the period of time encompassing the second voice signal 601 ends too quickly. Therefore, in FIG. 8, the user sets about the task of prolonging the duration of the second voice signal 601. To do so, the user places the pointer 105 somewhere within the second voice signal 601 and "drags" the pointer to the right, as shown, until the pointer arrives at a location which the user guesses will produce a second voice signal 601 having a more likable sound. It is important to note that the voice editor shades the added area differently from the way in which the original second voice signal 601 area was shaded. It is also highly important to note that the second name "B" continues to refer to the second voice signal 601, even after it has been modified.

Figure 9:
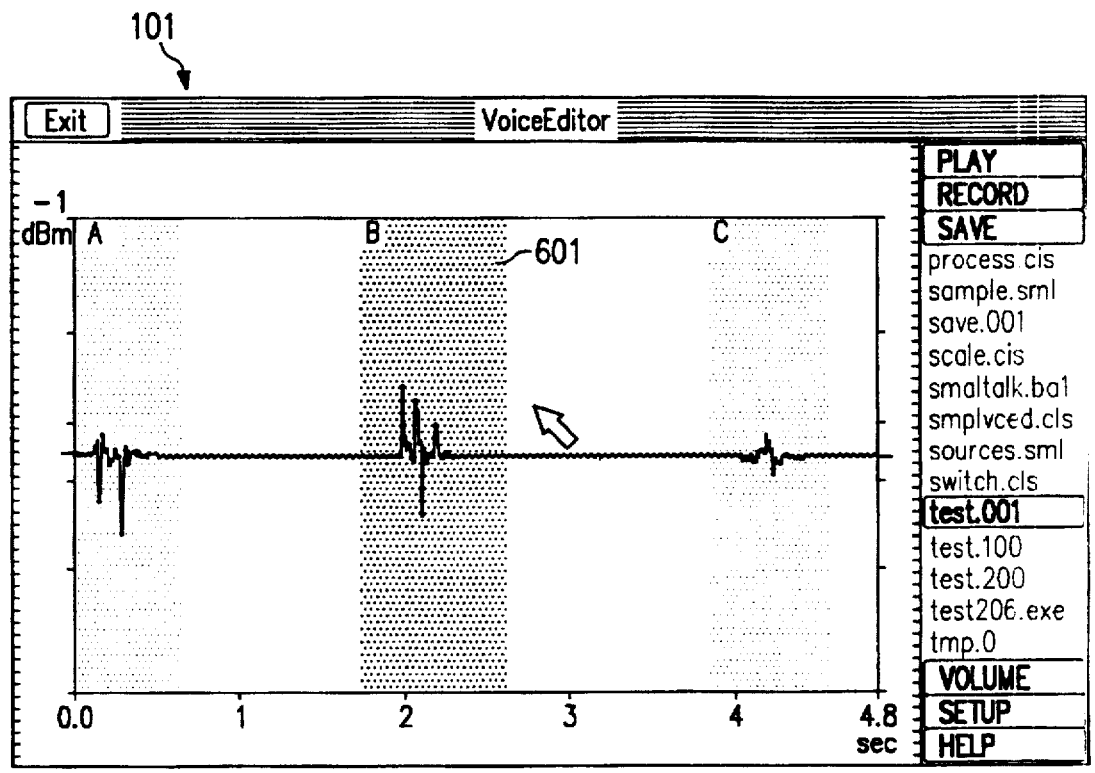
FIG. 9 shows a voice editor screen wherein the lengthened second voice signal has retained its original second name.

Turning now to FIG. 9, shown again is the voice editor screen 101 of FIG. 1. Once the user is satisfied with his choice for a new duration for the second voice signal 601, the voice editor then shades the entire second voice signal 601 area with the same shading, thereby signifying that the second voice signal's area is a single unit.

Figure 8:
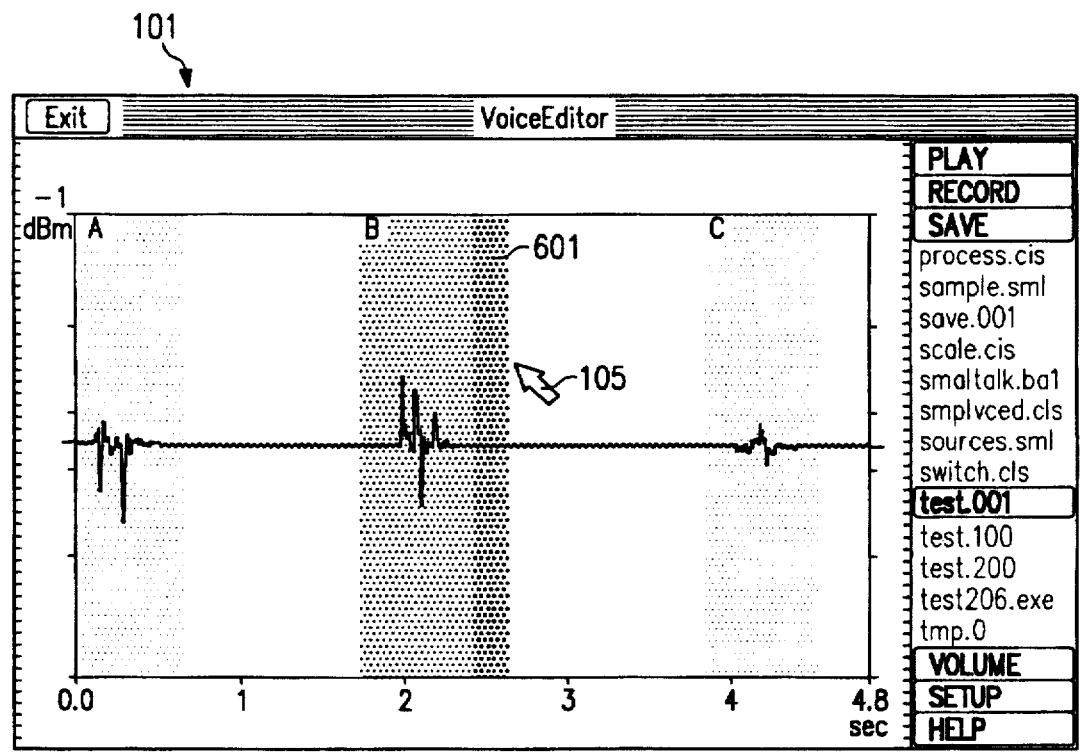
FIG. 8 shows a voice editor screen wherein the second voice signal is lengthened.
Figure 10:
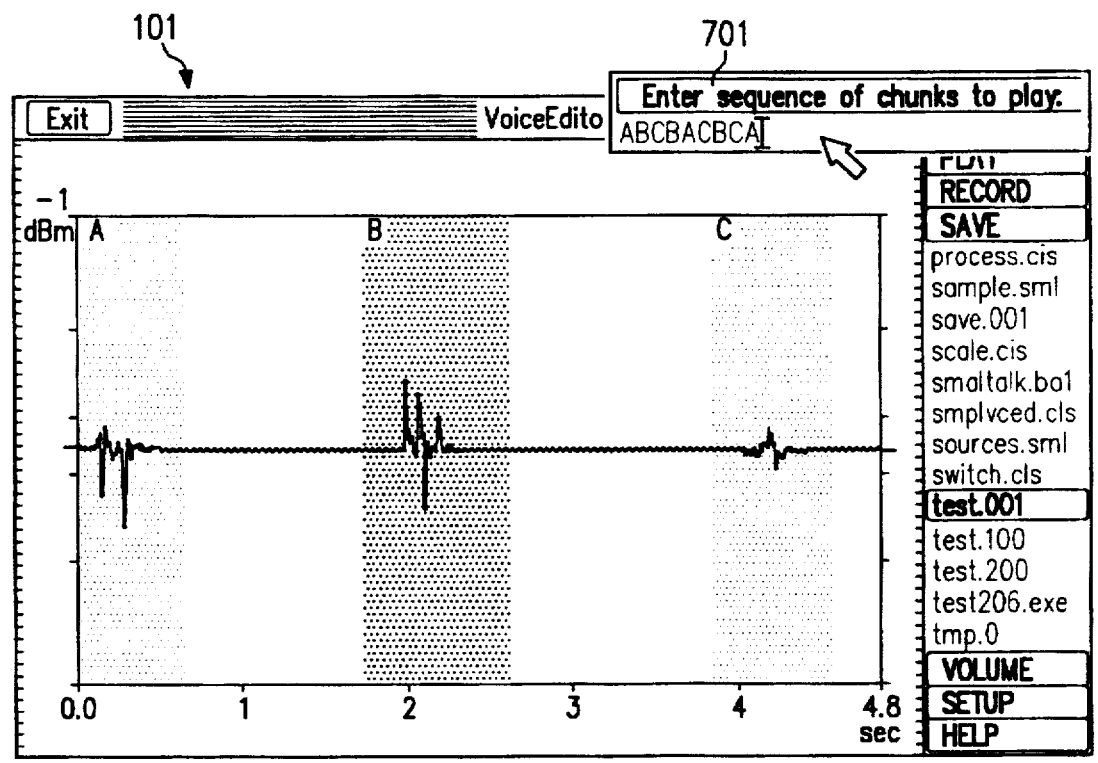
FIG. 10 shows a voice editor screen wherein the string constructed and played in FIG. 7 is replayed, the second voice signal having been modified.

Turning now to FIG. 10, the user has now reopened the play window 701 of FIG. 7, with its string intact. The user can now play and listen to the string as originally constructed, but with the modifications the user made (as shown in FIG. 8) intact. The ability to retain the original string and simply modify a particular voice signal attribute is at the heart of the present invention and allows the user great efficiency, effectiveness and power in dealing with editing of voice signals.

Figure 11:
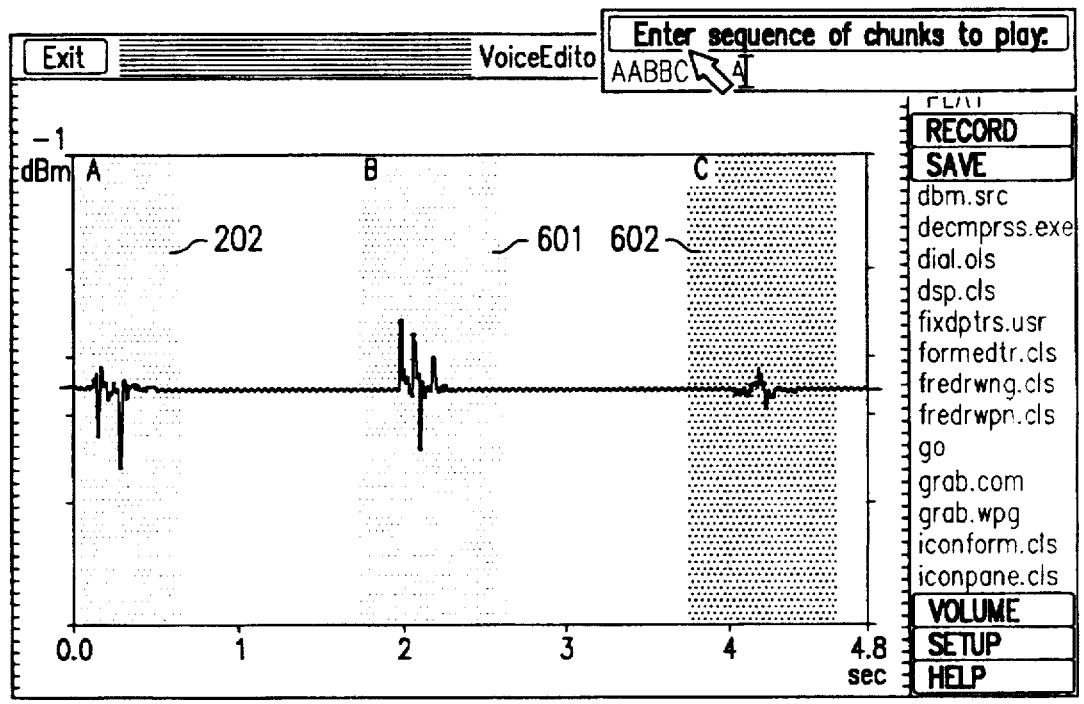
FIG. 11 shows a voice editor screen wherein the first, second and third voice signals have been further modified, without changing the string.

Turning now to FIG. 11, shown is a further iteration of the process wherein the user has changed the duration of the first voice signal 202, the second voice signal 601 and the third voice signal 602, ostensibly in response to a desire to further optimize the quality of the sound of the string. The user may simply continue this process until the string sounds its best, at which point the user can reorder the string or can simply save the voice signals separately, or in combination, to a storage medium for a later playback.

Figure 12:
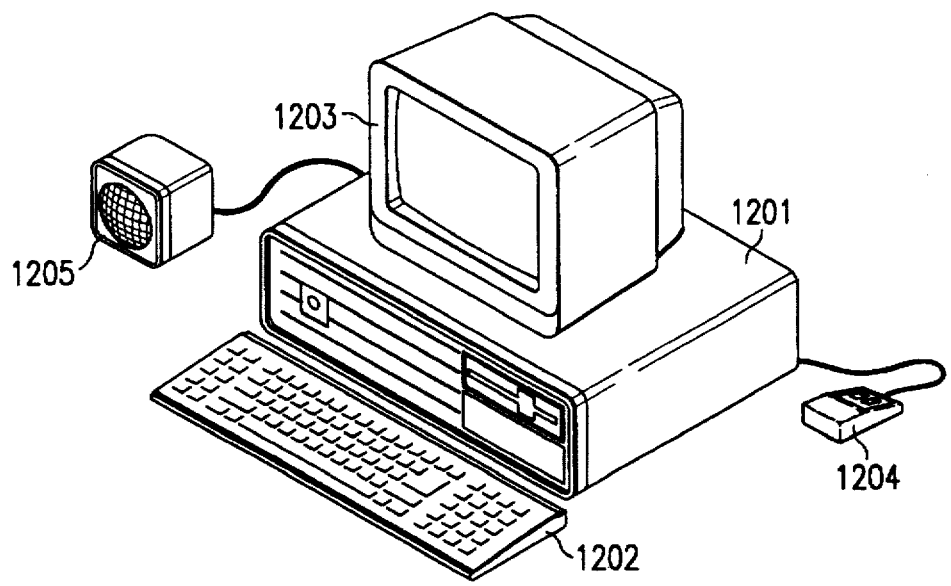
FIG. 12 represents a general purpose computer which serves as an operating environment for the present invention.

Turning now to FIG. 12, shown is a general purpose computer that provides the environment within which the present invention operates. Shown is a housing 1201 encompassing a processing unit, a keyboard 1202, a display unit 1203, a mouse 1204 for directing the pointer 105 of FIG. 1 and a speaker 1205 for playing speech.

From the foregoing, it is obvious that the present invention provides a method of editing a voice signal string, comprising the steps of labeling first and second voice signals with unique corresponding first and second names, concatenating the first and second names to thereby symbolically concatenate the first and second voice signals, the step of concatenating creating the voice signal string including the first and second voice signals and modifying an attribute of the first voice signal, the first name continuing to label the first voice signal following the step of modifying to thereby remove a need to reconcatenate the first and second names, the voice signal string remaining unchanged apart from modification of the first voice signal.

Although the present invention and its advantages have been described in detail, it should be understood that various changes, substitutions and alterations can be made herein without departing from the spirit and scope of the invention as defined by the appended claims.

What is claimed is:

1. A method of editing a voice signal string, comprising the steps of:
    labeling first and second voice signals with unique corresponding first and second names;
    concatenating a plurality of said first names each corresponding to the same said first voice signal with at least one of said second names into a predetermined sequence to thereby symbolically concatenate said first and second voice signals into a matching sequence, said step of concatenating symbolically creating said voice signal string including said first and second voice signals; and
    modifying an attribute of said first voice signal causing all occurrences of said first name to reflect said modification, said first name continuing to label said first voice signal following said step of modifying.

2. The method as recited in claim 1 wherein said first and second names are single alphanumeric characters.

3. The method as recited in claim 1 wherein said voice signal string can be played to a listener.

4. The method as recited in claim 1 wherein said attribute is a length of said first voice signal.

5. The method as recited in claim 4 wherein said attribute is a beginning time of said first voice signal.

6. The method as recited in claim 4 wherein said attribute is an ending time of said first voice signal.

7. A voice signal string editing apparatus, comprising:
    circuitry for labeling first and second voice signals with unique corresponding first and second names;
    circuitry for concatenating a plurality of said first names each corresponding to the same said first voice signal with at least one of said second names into a predetermined sequence to thereby symbolically concatenate said first and second voice signals into a matching sequence, said concatenating circuitry symbolically creating said voice signal string including said first and second voice signals; and circuitry for modifying an attribute of said first voice signal causing all occurrences of said first name to reflect said modification, said first name continuing to label said first voice signal following said modifying of said attribute.

8. The apparatus as recited in claim 7 wherein said voice signal string can be played to a listener.

9. The apparatus as recited in claim 7 wherein said attribute is a length of said first voice signal.

10. The apparatus as recited in claim 9 wherein said attribute is a beginning time of said first voice signal.

11. The apparatus as recited in claim 9 wherein said attribute is an ending time of said first voice signal.

12. A system for editing a voice signal string, comprising:

means for displaying first and second voice signals on a display device of a general purpose computer;

means for labeling said first and second voice signals with unique corresponding first and second names;

means for concatenating a plurality of said first names each corresponding to the same said first voice signal with at least one of said second names into a predetermined sequence to thereby symbolically concatenate said first and second voice signals into a matching sequence, said concatenating means symbolically creating said voice signal string including said first and second voice signals, said concatenating means including a processing device in said general purpose computer;

means for modifying an attribute of said first voice signal causing all occurrences of said first name to reflect said modification, said first name continuing to label said first voice signal following said modifying of said attribute; and means for playing said voice signal string to a listener on an output device of said general purpose computer, thus enabling the listener to hear immediately the modification to said first voice signal replicated throughout said voice signal string.

13. The system as recited in claim 12 wherein said attribute is a length of said first voice signal.

14. The system as recited in claim 13 wherein said attribute is a beginning time of said first voice signal.

15. The system as recited in claim 13 wherein said attribute is an ending time of said first voice signal.

16. A method of editing a voice signal string, wherein said voice signal string is represented as a waveform on a display device coupled to a data processing system, said method comprising the steps of:

labeling first and second voice signals displayed as waveforms on said display device with unique corresponding first and second names, wherein said first and second voice signals represent spoken words;

concatenating a plurality of said first names each corresponding to the same said first voice signal with at least one of said second names into a predetermined sequence to thereby symbolically concatenate said first and second voice signals into a matching sequence, said step of concatenating symbolically creating said voice signal string including said first and second voice signals, said concatenating step implemented by input from a user through the use of an input device coupled to said data processing system; and with assistance from said display device and said input device, modifying an attribute of said first voice signal causing all occurrences of said first name to reflect said modification, said first name continuing to label said first voice signal following said step of modifying.

17. A voice signal string editing apparatus, comprising:

circuitry and a device for storing digitized versions of both a first and a second voice signal;

circuitry and an output device for displaying both said first and second voice signals as amplitude versus time waveforms;

circuitry for labeling said first and second voice signals with unique corresponding first and second names, wherein said first and second names are single alphanumeric characters;

circuitry and an input device for concatenating a plurality of said first names each corresponding to the same said first voice signal with at least one of said second names into a predetermined sequence to thereby symbolically concatenate said first and second voice signals into a matching sequence, said concatenating circuitry symbolically creating said voice signal string including said first and second voice signals;

circuitry and said output device for displaying said voice signal string as an amplitude versus time waveform that is a displayed concatenation of said amplitude versus time waveforms representing said first and second voice signals;

circuitry for modifying an attribute of said first voice signal causing all occurrences of said first name to reflect said modification, said first name continuing to label said first voice signal following said modifying of said attribute; and circuitry and said output device for displaying said modification of said attribute of said first voice signal.

18. A voice signal string editing apparatus, comprising:

circuitry adaptable for allowing a user to label first and second voice signals with unique corresponding first and second names, wherein said first and second voice signals represent spoken words that have been digitized and stored within said apparatus;

circuitry for displaying said first and second voice signals;

circuitry adaptable for allowing a user to concatenate a plurality of said first names each corresponding to the same said first voice signal with at least one of said second names into a predetermined sequence to thereby symbolically concatenate said first and second voice signals into a matching sequence, said concatenating circuitry symbolically creating said voice signal string including said first and second voice signals;

said circuitry for displaying said first and second voice signals also for displaying said voice signal string; and circuitry coupled to said second circuitry for displaying and adaptable for allowing a user to modify an attribute of said first voice signal causing all occurrences of said first name to reflect said modification, said first name continuing to label said first voice signal following modification of said attribute.

19. A system for editing a voice signal string, comprising:

means for displaying first and second voice signals as amplitude versus time waveforms on a display device of a general purpose computer;

means for labeling said first and second voice signals with unique corresponding first and second names, wherein said first and second names are single alphanumeric characters, said labeling means including an input device coupled to said computer;

means for concatenating a plurality of said first names each corresponding to the same said first voice signal with at least one of said second names into a predetermined sequence to thereby symbolically concatenate said first and second voice signals into a matching sequence, said concatenating means including said input device and a processing device in said general purpose computer, concatenation of said first and second voice signals displayed as an amplitude versus time waveform on said display device;

means for modifying an attribute of said first voice signal causing all occurrences of said first name to reflect said modification, said first name continuing to label said first voice signal following said modifying of said attribute; and means for playing said voice signal string to a listener on an output device of said general purpose computer, thus enabling the listener to hear immediately the modification to said first voice signal replicated throughout said voice signal string.

20. A system for editing a voice signal string, comprising:

means for displaying first and second voice signals on a display device of a general purpose computer, wherein said first and second voice signals represent spoken words;

means for labeling said first and second voice signals with unique corresponding first and second names, wherein said first and second names are single alphanumeric characters;

means for concatenating a plurality of said first names each corresponding to the same said first voice signal with at least one of said second names into a predetermined sequence to thereby symbolically concatenate said first and second voice signals into a matching sequence, said concatenating means including a processing device in said general purpose computer;

means for modifying an attribute of said first voice signal causing all occurrences of said first name to reflect said modification, said first name continuing to label said first voice signal following said modifying of said attribute; and means for playing said voice signal string to a listener on an output device of said general purpose computer, thus enabling the listener to hear immediately the modification to said first voice signal replicated throughout said voice signal string.

* * * * *